United States Patent
Kim et al.

(10) Patent No.: US 9,432,739 B2
(45) Date of Patent: Aug. 30, 2016

(54) IMAGE DISPLAY APPARATUS AND METHOD FOR OPERATING THE SAME

(71) Applicant: LG ELECTRONICS INC., Seoul (KR)

(72) Inventors: Jaeuk Kim, Seoul (KR); Seunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/835,703

(22) Filed: Mar. 15, 2013

(65) Prior Publication Data

US 2014/0109125 A1    Apr. 17, 2014

(30) Foreign Application Priority Data

Oct. 11, 2012  (KR) .................. 10-2012-0113115

(51) Int. Cl.

| H04N 21/482 | (2011.01) |
|---|---|
| H04N 21/472 | (2011.01) |
| H04N 21/442 | (2011.01) |
| H04N 21/443 | (2011.01) |
| H04N 21/466 | (2011.01) |

(52) U.S. Cl.
CPC ........ *H04N 21/482* (2013.01); *H04N 21/4438* (2013.01); *H04N 21/44204* (2013.01); *H04N 21/44213* (2013.01); *H04N 21/4668* (2013.01); *H04N 21/472* (2013.01); *H04N 21/4826* (2013.01)

(58) Field of Classification Search
CPC ............... H04N 21/44204; H04N 21/44213; H04N 21/4668; H04N 21/482
See application file for complete search history.

(56) References Cited

U.S. PATENT DOCUMENTS

| 5,907,321 | A  | * | 5/1999  | Grossman et al. ............ 725/32 |
|---|---|---|---|---|
| 7,735,102 | B1 |   | 6/2010  | Billmaier et al. ............ 725/37 |
| 8,375,406 | B2 |   | 2/2013  | Sumiyoshi et al. |
| 2005/0120366 | A1 |   | 6/2005  | Thurbon ........................... 725/9 |
| 2006/0200842 | A1 | * | 9/2006  | Chapman et al. ............ 725/34 |
| 2007/0089125 | A1 |   | 4/2007  | Claassen ........................... 725/9 |
| 2007/0094292 | A1 |   | 4/2007  | Kataoka |
| 2009/0307731 | A1 | * | 12/2009 | Beyabani ........................ 725/87 |
| 2010/0138864 | A1 | * | 6/2010  | Yoakum ........................ 725/44 |
| 2011/0072448 | A1 | * | 3/2011  | Stiers et al. ................... 725/10 |
| 2011/0106744 | A1 |   | 5/2011  | Becker et al. |
| 2011/0191720 | A1 |   | 8/2011  | Lee .............................. 715/838 |

(Continued)

FOREIGN PATENT DOCUMENTS

| CN | 1898950 | 1/2007 |
|---|---|---|
| CN | 101237559 | 8/2008 |

(Continued)

OTHER PUBLICATIONS

European Search Report dated Apr. 14, 2014 issued on European Patent Application No. 13 158 912.9.

(Continued)

*Primary Examiner* — Rong Le
(74) *Attorney, Agent, or Firm* — KED & Associates, LLP

(57) ABSTRACT

A method may be provided for displaying an image display apparatus. Channels may be changed on the image display apparatus based on a user channel change command. A channel change state may be determined, and a determination may be made when a total number of channels satisfies a prescribed criterion. Information regarding recommended content may be displayed when the determined number of channel changes satisfies the prescribed criterion.

20 Claims, 13 Drawing Sheets

(56) References Cited

U.S. PATENT DOCUMENTS

2012/0257120 A1 10/2012 Nakai .......................... 348/731
2013/0007792 A1* 1/2013 Jeon et al. ..................... 725/14

FOREIGN PATENT DOCUMENTS

| CN | 102067619 | 5/2011 |
| EP | 2 464 138 A1 | 6/2012 |
| JP | 2005-160114 A | 6/2005 |
| JP | 2007-215046 | * 8/2007 ............. H04N 7/173 |
| JP | 2007-215046 A | 8/2007 |
| KR | 10 2008 0109232 A | 12/2008 |
| WO | WO 2011/077642 A1 | 6/2011 |

OTHER PUBLICATIONS

Chinese Office Action for Application 201310127861.1 dated May 30, 2016 (full Chinese text).

* cited by examiner

IMAGE DISPLAY APPARATUS AND METHOD FOR OPERATING THE SAME

CROSS-REFERENCE TO RELATED APPLICATION

This application claims the priority benefit from Korean Patent Application No. 10-2012-0113115, filed Oct. 11, 2012, the subject matter of which is incorporated herein by reference.

BACKGROUND

1. Field

Embodiments may relate to an image display apparatus and a method for operating the same.

2. Background

An image display apparatus may function to display images to a user. A user can view a broadcast program using an image display apparatus. The image display apparatus can display a broadcast program selected by the user on a display from among broadcast programs transmitted from broadcast stations. A trend in broadcasting is a worldwide transition from analog broadcasting to digital broadcasting.

Digital broadcasting may involve transmission of digital audio and video signals. Digital broadcasting may offer many advantages over analog broadcasting, such as robustness against noise, less data loss, ease of error correction, and/or the ability to provide clear, high-definition images. Digital broadcasting may also allow interactive viewer services, unlike analog broadcasting.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary arrangements and/or embodiments may be described with reference to the attached drawings.

The terms "module" and "unit" attached to describe names of components may be used herein to help the understanding of the components and thus should not be considered as having specific meanings or roles. Accordingly, the terms "module" and "unit" may be used interchangeably.

Figure 1:
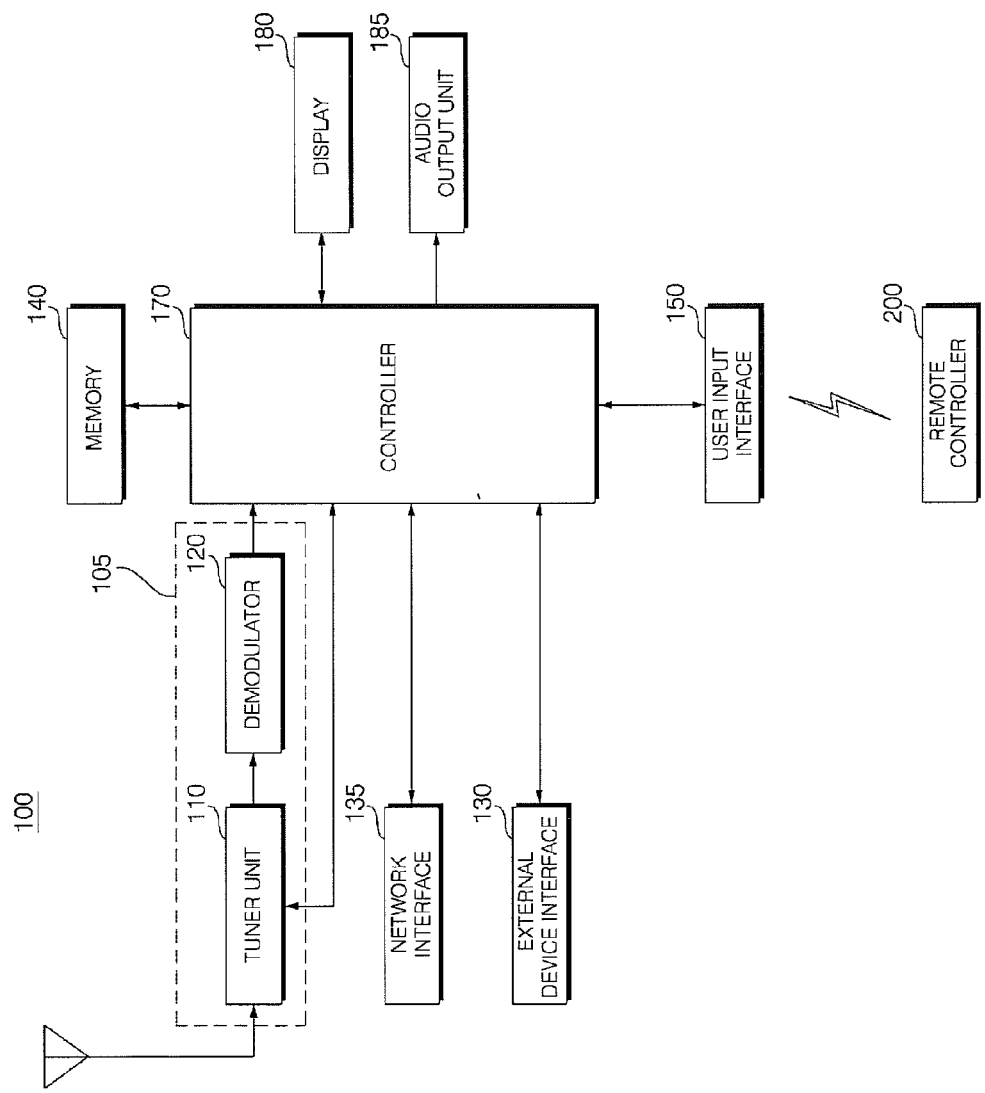
FIG. 1 is a block diagram showing an internal configuration of an image display apparatus according to an example embodiment.

FIG. 1 is a block diagram showing an internal configuration of the image display apparatus according to an example embodiment. Other arrangements and embodiments may also be provided.

FIG. 1 shows the image display apparatus 100 that includes a broadcast reception unit 105, an external device interface 130, a memory 140, a user input interface 150, a sensor unit, a controller 170, a display 180 and an audio output unit 185.

The broadcast reception unit 105 may include a tuner unit 110, a demodulator 120 and a network interface 135. The broadcast reception unit 105 may include only the tuner unit 110 and the demodulator 120 or only the network interface 135.

The tuner unit 110 may tune to a Radio Frequency (RF) broadcast signal corresponding to a channel selected by a user from among RF broadcast signals received through an antenna or RF broadcast signals corresponding to all channels previously stored in the image display apparatus. The tuned RF broadcast may be converted into an Intermediate Frequency (IF) signal or a baseband Audio/Video (AV) signal.

For example, the tuned RF broadcast signal may be converted into a digital IF signal DIF when it is a digital broadcast signal, and the tuned RF broadcast signal may be converted into an analog baseband AV signal (Composite Video Banking Sync/Sound Intermediate Frequency (CVBS/SIF)) when it is an analog broadcast signal. That is, the tuner unit 110 may process a digital broadcast signal or an analog broadcast signal. The analog baseband AV signal (CVBS/SIF) output from the tuner unit 110 may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The tuner unit 110 may include a plurality of tuners in order to receive broadcast signals of a plurality of channels. Alternatively, the tuner unit 110 may include a single tuner for simultaneously receiving broadcast signals of a plurality of channels.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and may be subjected to demultiplexing and A/V signal processing. The processed video and audio signals are output to the display 180 and the audio output unit 185, respectively.

The external device interface 130 may serve to transmit or receive data to or from an external device connected thereto. For interfacing, the external device interface 130 may include an A/V Input/Output (I/O) unit and/or a wireless communication module.

The external device interface 130 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit may externally receive video and audio signals from the external device. The wireless communication unit may perform short-range wireless communication with another electronic apparatus.

The network interface 135 may serve as an interface between the image display apparatus 100 and a wired/wireless network such as the Internet. The network interface 135 may receive content or data provided by an Internet or content provider or a network operator over a network.

The network interface 135 may perform data communication with an electronic apparatus located near the image display apparatus 100. The network interface 135 may receive apparatus information of another electronic apparatus or remote controllable channel information, frequency information or code information of another electronic apparatus.

The memory 140 may store various programs necessary for the controller 170 to process and control signals, and the memory may also store processed video, audio and data signals.

The memory 140 may temporarily store a video, audio and/or data signal received from the external device interface 130. The memory 140 may store information regarding a predetermined broadcast channel by the channel storage function of a channel map.

The memory 140 may store infrared (IR) format key codes for controlling other electronic apparatuses as IR signals and store an IR format key database of a plurality of electronic apparatuses.

While the memory 140 is shown in FIG. 1 as being configured separately from the controller 170, the memory 140 may be incorporated into the controller 170, or may be provided in another configuration.

The user input interface 150 may transmit a signal input by the user to the controller 170 or may transmit a signal received from the controller 170 to the user.

For example, the user input interface 150 may transmit/receive various user input signals such as a power-on/off signal, a channel selection signal, and a screen setting signal from a remote controller 200, may provide the controller 170 with user input signals received from local keys, such as inputs of a power key, a channel key, and a volume key, and setting values, or provide the controller 170 with a user input signal received from a sensor unit for sensing a user gesture, or transmit a signal received from the controller 170 to a sensor unit.

According to an example embodiment, the user input interface 150 may receive personal information from the remote controller 200. The user input interface 150 may further receive information about a web server accessed using the personal information in addition to the personal information.

The user input interface 150 may receive apparatus information of another electronic apparatus or remote controllable channel information, frequency information or code information of another electronic apparatus from an electronic apparatus located near the image display apparatus 100 through the remote controller 200.

The controller 170 may demultiplex the stream signal received from the tuner unit 110, the demodulator 120, or the external device interface 130 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. The audio signal processed by the controller 170 may be transmitted to the external output device through the external device interface 130.

The controller 170 may include a DEMUX, a video processor, etc., which may be described in detail later with reference to FIG. 2.

The controller 170 may control overall operation of the image display apparatus 100. For example, the controller may 170 control the tuner unit 110 to tune to an RF signal corresponding to a channel selected by the user or a previously stored channel.

The controller 170 may control the image display apparatus 100 by a user command input through the user input interface 150 or an internal program.

The controller 170 may control the display 180 to display images. The image displayed on the display 180 may be a Two-Dimensional (2D) or Three-Dimensional (3D) still or moving image.

The controller 170 may generate and display a predetermined object of an image displayed on the display 180, such as a 3D object. For example, the object may be at least one of a screen of an accessed website (newspaper, magazine, etc.), an electronic program guide (EPG), various menus, a widget, an icon, a still image, a moving image, text, etc.

The controller 170 may recognize the position of the user based on an image captured by a camera unit. For example, a distance (z-axis coordinate) between the user and the image display apparatus 100 may be detected. An x-axis coordinate and a y-axis coordinate in the image display apparatus 100 corresponding to the position of the user may be detected.

According to an example embodiment, the controller 170 may control login based on the personal information received from the remote controller 200. Login may be login of the image display apparatus 100, login of a server connected to the image display apparatus 100, or login of a predetermined web server to which a user subscribes using personal information thereof.

For example, if the user logs in to the image display apparatus 100 using personal ID information and password information received from the remote controller 200, the controller 170 may control the display 180 to display a personal screen of the user set according to a user account. If there is an image that is being viewed, the controller 170 may control the display 180 to display a personal setting screen along with the image that is being viewed. Alternatively, the controller 170 may switch the image that is being viewed to a personal setting screen.

The controller 170 may control a power supply for supplying power to the image display apparatus 100 when the image display apparatus 100 is in an off state when the personal information is received. That is, when the user input interface 150 receives the personal information in a standby mode, the controller 170 may switch the standby mode to a wakeup mode and control the power supply to supply power to various modules or units.

The controller 170 may determine whether each electronic apparatus is connected according to the personal information from the remote controller 200 based on apparatus information of another electronic apparatus located near the image display apparatus 100 or remote controllable channel information, frequency information or code information of another electronic apparatus, which is received from the network interface 135 or the user input interface 150, and the controller 170 may control the display 180 to display an object indicating that another electronic apparatus has been logged in.

Alternatively, the controller 170 may control transmission of apparatus information, channel information, frequency information and code information to the remote controller 200, based on apparatus information of another electronic apparatus located near the image display apparatus 100 or remote controllable channel information, frequency information or code information of another electronic apparatus.

A channel browsing processor for generating a thumbnail image corresponding to a channel signal or an external input signal may be further included. The channel browsing processor may receive the stream signal TS output from the demodulator 120 or the stream signal output from the external device interface 130, extract an image from the received stream signal, and generate a thumbnail image. The generated thumbnail image may be decoded into a stream form to be input to the controller 170 together with the decoded image. The controller 170 may display a thumbnail list including a plurality of thumbnail images on the display 180 using the input thumbnail image.

The thumbnail list may be displayed in a brief viewing method of displaying the thumbnail list in a part of an area in a state of displaying a predetermined image or may be displayed in a full viewing method of displaying the thumbnail list in a full area. The thumbnail images in the thumbnail list may be sequentially updated.

The display 180 converts the video signal, the data signal, the OSD signal and the control signal processed by the controller 170 or the video signal, the data signal and the control signal received by the external device interface 130 and generates a drive signal.

The display 180 may be a Plasma Display Panel (PDP), a Liquid Crystal Display (LCD), an Organic Light-Emitting Diode (OLED) display or a flexible display. The display 180 may be a 3D display.

If the display 180 is a touchscreen, the display 180 may function as not only an output device but also as an input device.

The audio output unit 185 receives the audio signal processed by the controller 170 and outputs the received audio signal as sound.

The camera unit captures images of a user. The camera unit may be implemented by one camera, but embodiments are not limited thereto. That is, the camera unit may be implemented by a plurality of cameras. The camera unit may be embedded in the image display apparatus 100 at the upper side of the display 180 or may be separately provided. Image information captured by the camera unit may be input to the controller 170.

The controller 170 may sense a user gesture from an image captured by the camera unit, a signal sensed by the sensor unit, or a combination of the captured image and the sensed signal.

The remote controller 200 transmits user input to the user input interface 150. For transmission of user input, the remote controller 200 may use various communication techniques such as Bluetooth, RF communication, IR communication, Ultra Wideband (UWB), ZigBee and near field communication (NFC).

The remote controller 200 may receive a video signal, an audio signal or a data signal from the user input interface 150. The remote controller 200 may output the received signals visually or audibly based on the received video, audio or data signal.

The remote controller 200 may receive information by near field communication with a predetermined electronic apparatus. The information may include personal ID information and password information that may be used in the mobile terminal, the image display apparatus or the electronic apparatus.

The remote controller 200 may transmit the received personal information to the image display apparatus 100. An IR method or an RF method may be used as the communication method.

In the example embodiment, it is assumed that the remote controller 200 is a pointing device for displaying a pointer corresponding to user motion. That is, the remote controller 200 may transmit personal information to the image display apparatus 100 using an RF method.

The remote controller 200 may further receive information about a web server accessed using the personal information in addition to the personal information. For example, the remote controller 200 may receive web server information of a social network service that is being logged in to and accessed by the mobile terminal. Such web server information is also transmitted to the image display apparatus 100.

The remote controller 200 may receive apparatus information of another electronic apparatus or remote controllable channel information, frequency information or code information of another electronic apparatus from an electronic apparatus located near the image display apparatus 100. Based on information about another electronic apparatus, a channel, frequency or code may be allocated to the electronic apparatus so as to perform remote control.

The image display apparatus 100 may be a fixed or mobile digital broadcast receiver capable of receiving a digital broadcast.

The block diagram of the image display apparatus 100 shown in FIG. 1 is only exemplary. Depending upon specifications of the image display apparatus 100 in actual implementation, components of the image display apparatus 100 may be combined or omitted or new components may be added. That is, two or more components may be incorporated into one component or one component may be configured as separate components, as needed. The function of each block may be described for the purpose of describing the embodiment and thus specific operations or devices should not be construed as limiting the scope and spirit.

The image display apparatus 100 may not include the tuner unit 110 and the demodulator 120 shown in FIG. 1, and may receive broadcast content via the network interface 135 or the external device interface 135 and play the broadcast content back.

Figure 2:
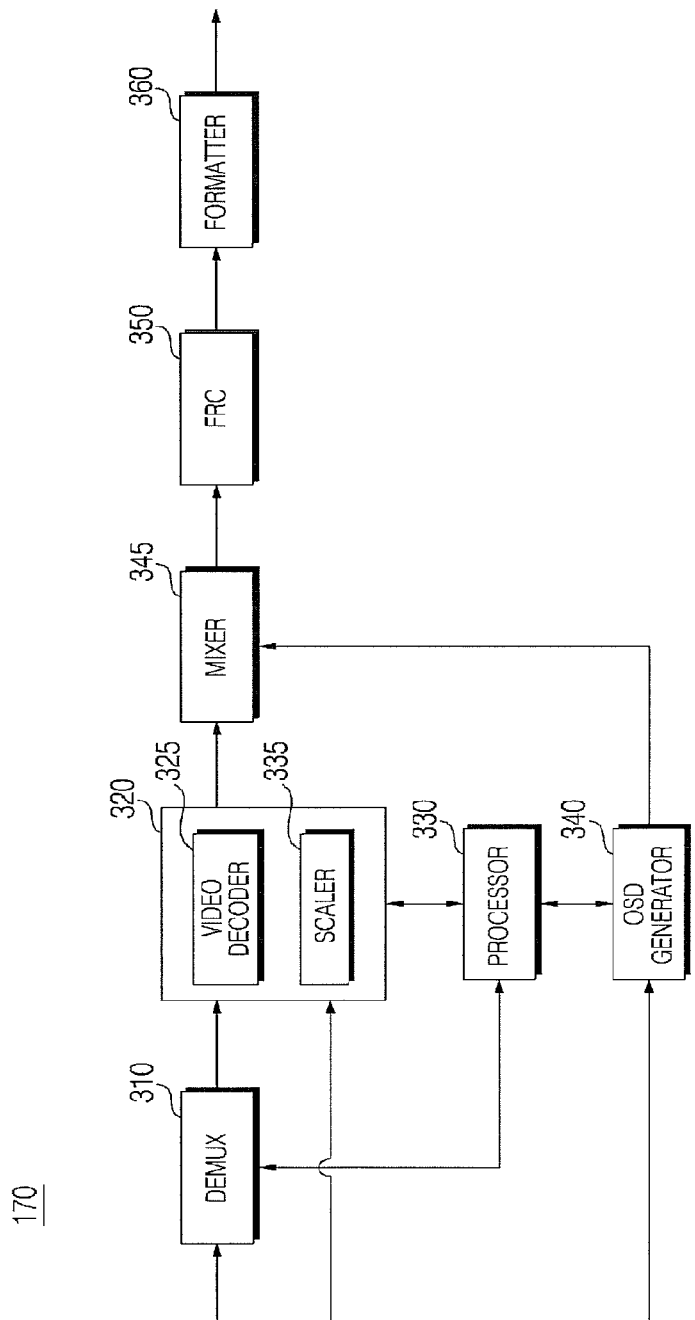
FIG. 2 is a block diagram showing the internal configuration of a controller of FIG. 1.

FIG. 2 is a block diagram showing internal configuration of the controller shown in FIG. 1.

Referring to FIG. 2, the controller 170 according to the embodiment may include a DEMUX 310, a video processor 320, a processor 330, an OSD generator 340, a mixer 345, a Frame Rate Converter (FRC) 350, and a formatter 360. The controller 170 may further include an audio processor and a data processor.

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 may decode the demultiplexed video signal and the scaler 335 may scale resolution of the decoded video signal so that the video signal can be displayed on the display 180.

The video decoder 325 may be provided with decoders that operate based on various standards.

The processor 330 may control overall operation of the image display apparatus 100 or the controller 170. For example, the processor 330 may control the tuner unit 110 to tune to an RF broadcast corresponding to an RF signal corresponding to a channel selected by the user or a previously stored channel.

The processor 330 may control the image display apparatus 100 by a user command input through the user input interface 150 or an internal program.

The processor 330 may control data transmission of the network interface 135 or the external device interface 130.

The processor 330 may control the operation of the DEMUX 310, the video processor 320 and the OSD generator 340 of the controller 170.

The OSD generator 340 may generate an OSD signal autonomously or according to user input. For example, the OSD generator 340 may generate signals by which a variety of information is displayed as graphics or text on the display 180, according to user input signals. The OSD signal may include various data such as a User Interface (UI), a variety of menus, widgets, icons, etc. The OSD signal may include a 2D object and/or a 3D object.

The OSD generator 340 may generate a pointer that can be displayed on the display according to a pointing signal received from the remote controller 200. Such a pointer may be generated by a pointing signal processor and the OSD generator 340 may include such a pointing signal processor. Alternatively, the pointing signal processor may be provided separately from the OSD generator 340.

In association with the embodiment, the OSD generator 340 may generate or configure a set personal screen when the user logs in to the image display apparatus 100. Alternatively, the OSD generator 340 may generate or configure at least a part of a server access screen so as to display a server access screen received from a server on the display 180 when the user logs in to the accessed server. Alternatively, the OSD generator 340 may generate or configure at least a part of a web server access screen based on information about (or regarding) a web server that is being accessed using personal information.

The mixer 345 may mix the decoded video signal processed by the video processor 320 with the OSD signal generated by the OSD generator 340. Each of the OSD signal and the decoded video signal may include at least one of a 2D signal and a 3D signal. The mixed video signal may be provided to the FRC 350.

The FRC 350 may change a frame rate of an input image. The FRC 350 may maintain the frame rate of the input image without frame rate conversion.

The formatter 360 may change the format of the signal mixed by the mixer 345 (i.e., the OSD signal and decoded video signal) to be suitable for the display 180. For example, the formatter 360 may convert a received signal into an RGB data signal. The RGB signal may be output in the form of a Low Voltage Differential Signal (LVDS) or mini-LVDS.

The formatter 360 may separate a 2D video signal and a 3D video signal, for 3D video display. The formatter 360 may change the format of a 3D video signal or convert a 2D video signal into a 3D video signal.

The audio processor of the controller 170 may process the demultiplexed audio signal. For audio signal processing, the audio processor may have various decoders.

The audio processor of the controller 170 may also adjust the bass, treble or volume of the audio signal.

The data processor of the controller 170 may process the demultiplexed data signal. For example, if the demultiplexed data signal was encoded, the data processor may decode the data signal. The encoded data signal may be Electronic Program Guide (EPG) information including broadcasting information such as start time and end time of broadcast programs of each channel.

Although the formatter 360 performs 3D processing after the signals from the OSD generator 340 and the video processor 320 are mixed by the mixer 345 in FIG. 2, embodiments are not limited thereto and the mixer 345 may be located at a next stage of the formatter.

The block diagram of the controller 170 (FIG. 2) is exemplary. The components of the block diagrams may be integrated or omitted, or a new component may be added according to specifications of the controller 170.

In particular, the FRC 350 and the formatter 360 may be included separately from the controller 170.

Figure 3:
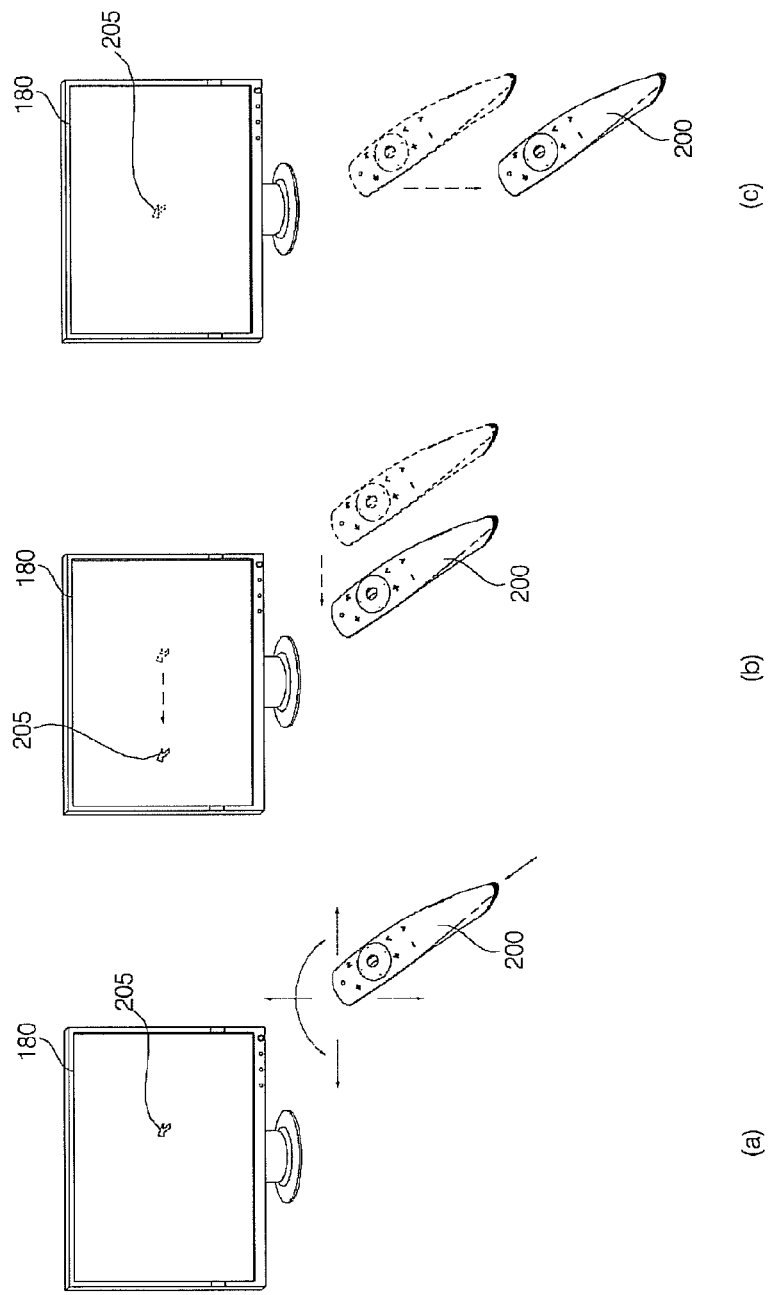
FIG. 3 is a diagram showing a method of controlling a remote controller of FIG. 1.

FIG. 3 is a diagram showing a method of controlling a remote controller (FIG. 1).

FIG. 3(a) illustrates a pointer 205 representing movement of the remote controller 200 displayed on the display 180.

The user may move or rotate the remote controller 200 up and down, side to side (FIG. 3(b)), and back and forth (FIG. 3(c)). The pointer 205 displayed on the display 180 (of the image display apparatus) corresponds to the movement of the remote controller 200. Since the pointer 205 moves in accordance with the movement of the remote controller 200 in a 3D space, the remote controller 200 may be referred to as a pointing device.

Referring to FIG. 3(b), if the user moves the remote controller 200 to the left, the pointer 205 moves to the left on the display 180 (of the image display apparatus).

Information about movement of the remote controller 200 sensed by the sensor of the remote controller 200 is transmitted to the image display apparatus. The image display apparatus may calculate coordinates of the pointer 205 from the information regarding the movement of the remote controller 200. The image display apparatus may display the pointer 205 at the calculated coordinates.

Referring to FIG. 3(c), while pressing a predetermined button of the remote controller 200, the user may move the remote controller 200 away from the display 180. A selection area corresponding to the pointer 205 may be zoomed in and enlarged on the display 180. If the user moves the remote controller 200 toward the display 180, the selection area corresponding to the pointer 205 is zoomed out and is thus contracted on the display 180. Alternatively, when the remote controller 200 moves away from the display 180, the selection area may be zoomed out and when the remote controller 200 approaches the display 180, the selection area may be zoomed in.

With the predetermined button pressed at the remote controller 200, the up, down, left and right movements of the remote controller 200 may be ignored. That is, when the remote controller 200 moves away from or approaches the display 180, only back and forth movements of the remote controller 200 are sensed, while up, down, left and right movements of the remote controller 200 are ignored. Unless the predetermined button is pressed at the remote controller 200, the pointer 205 moves in accordance with up, down, left or right movement of the remote controller 200.

Speed and direction of the pointer 205 may correspond to the speed and direction of the remote controller 200.

Figure 4:
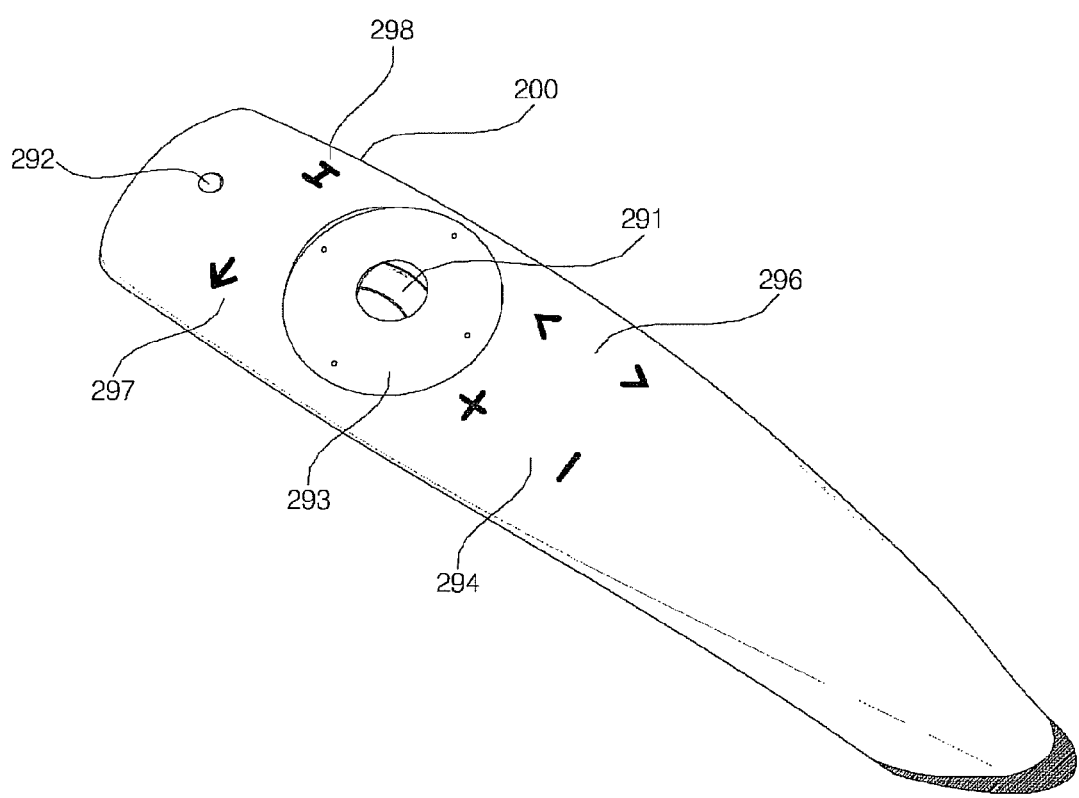
FIG. 4 is a perspective view of a remote controller according to an example embodiment.
Figure 5:
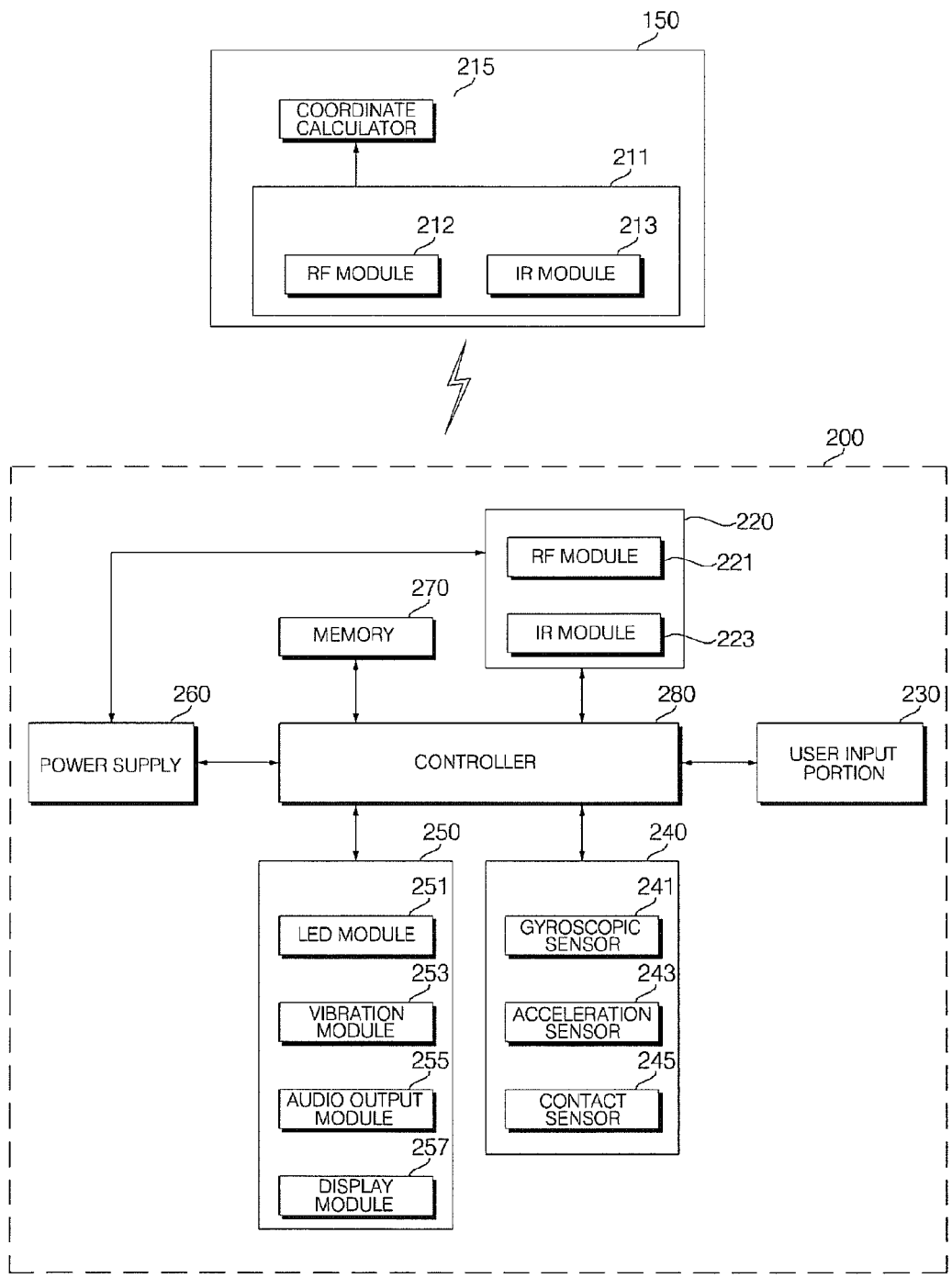
FIG. 5 is a block diagram showing the internal configuration of a remote controller according to an example embodiment.

FIG. 4 is a perspective view of a remote controller according to an example embodiment. FIG. 5 is a block diagram showing internal configuration of a remote controller according to an example embodiment. Other embodiments and configurations may also be provided.

Referring to FIG. 4, the pointing device 200 may include various input keys, input buttons, etc.

For example, the pointing device 200 may include an okay key 291, a menu key 292, a 4-direction key 293, a channel control key 294, and a volume control key 296.

For example, the okay key 291 may be used to select a menu or item, the menu key 292 may be used to display a predetermined menu, the 4-direction key 294 may be used to move a pointer or indicator up, down, left and right, the channel control key 294 may be used to move a channel up or down, and the volume control key 296 may be used for volume control.

The pointing device 200 may further include a back key 297 and a home key 298. For example, the back key 297 may be used to move a screen to a previous screen and the home key 298 may be used to move a screen to a home screen.

As shown in FIG. 4, the okay key 291 may further include a scroll function. For the scroll function, the okay key 291 may be implemented as a wheel key. That is, if the okay key 291 is pushed, the okay key 291 may be used to select a menu or item and, if the okay key 291 is scrolled up or down, the okay key 291 may be used to scroll a display screen or switch a list page.

More specifically, when the okay key 291 is scrolled for image searching in a state in which an image having a size greater than the size of the display is displayed on the display 180, an image region that is not currently displayed is displayed on the display 180. As another example, if the okay key 291 is scrolled in a state in which a list page is displayed on the display 180, a previous page or a next page of a current page may be displayed.

Such a scroll function may be included separately from the okay key 291.

The four-direction key 293 may include up, down, left and right keys in a circular shape as shown in FIG. 4. Touch input using the four-direction key 293 may be possible. For example, if a touch operation from the up key to the down key in the four-direction key 293 is performed, a set function may be input or performed according to the touch input.

Referring to FIG. 5, the remote controller 200 may include a radio transceiver 220, a user input portion 230, a sensor portion 240, an output portion 250, a power supply 260, a memory 270, and a controller 280.

The radio transceiver 220 may transmit and receive signals to and from any one of the image display devices. Among the image display apparatuses, for example, one image display apparatus 100 may be described.

In accordance with the exemplary embodiment, the remote controller 200 may be provided with an RF module 221 for transmitting and receiving signals to and from the image display device 100 according to an RF communication standard. The remote controller 200 may include an IR module 223 for transmitting and receiving signals to and from the image display device 100 according to an IR communication standard.

The remote controller 200 may further include an NFC module for NFC with an electronic apparatus.

The remote controller 200 may transmit information about movement of the remote controller 200 to the image display apparatus 100 via the RF module 221.

The remote controller 200 may receive the signal from the image display apparatus 100 via the RF module 221. The remote controller 200 may transmit commands associated with power on/off, channel change, volume change, etc. to the image display device 100 through the IR module 223.

The remote controller 200 may receive personal information by NFC with a predetermined electronic apparatus.

The remote controller 200 may transmit the received personal information to the image display apparatus 100. An IR method or an RF method may be used as a communication method.

The remote controller 200 may receive apparatus information of another electronic apparatus or remote controllable channel information, frequency information or code information of another electronic apparatus. Based on the information regarding another electronic apparatus, a channel, frequency or code may be allocated to the electronic apparatus so as to perform remote control.

The user input portion 230 may include a keypad, a key (button), a touch pad or a touchscreen. The user may enter a command related to the image display device 100 to the remote controller 200 by manipulating the user input portion 230. If the user input portion 230 includes hard keys, the user may enter commands related to the image display device 100 to the remote controller 200 by pushing the hard keys. If the user input portion 230 is provided with a touchscreen, the user may enter commands related to the image display device 100 to the remote controller 200 by touching soft keys on the touchscreen. The user input portion 230 may have a variety of input means that may be manipulated by the user, such as a scroll key, a jog key, etc., to which the present invention is not limited.

The sensor portion 240 may include a gyroscopic sensor 241 or an acceleration sensor 243. The gyroscopic sensor 241 may sense information regarding movement of the remote controller 200.

For example, the gyroscopic sensor 241 may sense information regarding movement of the remote controller 200 along x, y and z axes. The acceleration sensor 243 may sense information regarding velocity of the remote controller 200. The sensor portion 240 may further include a distance measurement sensor for sensing a distance from the display 180.

Alternatively, the sensor portion 240 may include a geomagnetic sensor for detecting flow of a magnetic field generated by earth and detecting a compass bearing to detect change in the compass bearing.

The sensor portion 240 may include a contact sensor 245 for sensing user contact. The contact sensor 245 senses contact of a part of a user's body and may be implemented in various manners. For example, the contact sensor 245 may be composed of a pressure sensor to determine whether pressure is applied or to detect intensity of pressure or is composed of a touch sensor to detect touch. Contact may be sensed by pressure or touch.

Some of sensors may not be directly brought into contact with a user's body according to a method of gripping the remote controller 200 by the user. Accordingly, user contact may include not only direct contact of the sensor but also whether a user's body approaches the sensor within a predetermined distance.

At least a part of the contact sensor 245 is composed of a proximity sensor for detecting an approaching object using change in alternating magnetic field, change in static magnetic field, or change in capacitance so as to detect an object or a part of a user's body approaching the remote controller 200 at a predetermined location or an object or a part of a user's body located in the vicinity of the remote controller 200.

The output portion 250 may output a video or audio signal corresponding to manipulation of the user input portion 230 or a signal transmitted by the image display device 100. The user may be aware from the output portion 250 whether the user input portion 230 has been manipulated or the image display device 100 has been controlled.

For example, the output portion 250 may include a Light Emitting Diode (LED) module 251 for illuminating when the user input portion 230 has been manipulated or a signal is transmitted to or received from the image display device 100 through the radio transceiver 220, a vibration module 253 for generating vibrations, an audio output module 255 for outputting audio, and/or a display module 257 for outputting video.

The power supply 260 may supply power to the remote controller 200. When the remote controller 200 is kept stationary for a predetermined time, the power supply 260 blocks power from the remote controller 200, thereby preventing waste of power. When a predetermined key of the remote controller 200 is manipulated, the power supply 260 may resume power supply.

The memory 270 may store a plurality of types of programs required for control or operation of the remote controller 200, or application data. When the remote controller 200 transmits and receives signals to and from the image display device 100 wirelessly through the RF module 221, the remote controller 200 and the image display device 100 perform signal transmission and reception in a predetermined frequency band. The controller 280 (of the remote controller 200) may store information regarding the frequency band in which to wirelessly transmit and receive signals to and from the image display device 100 paired with the remote controller 200 in the memory 270 and refer to the information.

The memory 270 may store IR format key codes for controlling other electronic apparatuses as IR signals and store an IR format key database of a plurality of electronic apparatuses.

The memory 270 may store statistical data for estimating user's body data and/or a working region.

The controller 280 may provide overall control to the remote controller 200. The controller 280 may transmit a signal corresponding to predetermined key manipulation on the user input portion 230 or a signal corresponding to an movement of the remote controller 200 sensed by the sensor portion 240 to the image display device 100 through the radio transceiver 220.

The controller 280 may estimate user's body data based on sensing information received from the contact sensor 245 and transmit the estimated body data information or the sensing information of the contact sensor 245 to the image display apparatus 100 via the radio transceiver 220.

The controller 280 may control transmission of the received personal information to the image display apparatus 100 through the radio transceiver 220 by NFC with an electronic apparatus. If a predetermined key input of the user input portion 230 is performed, the controller 280 may control transmission of the received personal information to the image display apparatus 100 through the radio transceiver 220.

The controller 280 may control transmission of the received personal information to an electronic apparatus other than the image display apparatus 100. Different channels, frequencies or codes may be used with respect to electronic apparatuses. Such channels, frequencies or codes may be based on apparatus information or remote controllable channel information, frequency information or code information previously received from another electronic apparatus.

The user input interface 150 of the image display device 100 may have a radio transceiver 211 for wirelessly transmitting and receiving signals to and from the remote controller 200, and a coordinate calculator 215 for calculating coordinates of the pointer corresponding to an operation of the remote controller 200.

The user input interface 150 may transmit and receive signals wirelessly to and from the remote controller 200 through an RF module 212. The user input interface 150 may also receive a signal from the remote controller 200 through an IR module 213 based on the IR communication standard.

The coordinate calculator 215 may calculate the coordinates (x, y) of the pointer to be displayed on the display 180 by correcting handshaking or errors from a signal corresponding to an operation of the remote controller 200 received through the radio transceiver 211.

A signal transmitted from the remote controller 200 to the image display apparatus 100 through the user input interface 150 is provided to the controller 180 (of the image display device 100). The controller 180 may identify information regarding an operation of the remote controller 200 or key manipulation on the remote controller 200 from the signal received from the remote controller 200 and control the image display device 100 according to the information.

The remote controller 200 may calculate coordinates of the pointer corresponding to operation of the remote controller 200 and output the coordinates to the user input interface 150 of the image display device 100. The user input interface 150 (of the image display device 100) may then transmit information regarding the received coordinates to the controller 180 without correcting handshaking or errors.

As another example, the coordinate calculator 215 may not be included in the user input interface 150 but may be included in the controller 170.

As functions of the image display apparatus 100 have been diversified, the image display apparatus 100 may receive not only broadcast channels but also content from various content providers over a network. However, it may be difficult for a user to remember all broadcast channels and a variety of content. Thus, the user may search for content information channel by channel.

If there is no broadcast channel desired by a user, the user may meaninglessly change channels, thereby wasting time.

Embodiments may provide information regarding (or about) recommended content when a user meaninglessly changes channels. Since the user may easily select and execute recommended content, user convenience may be improved.

Figure 6:
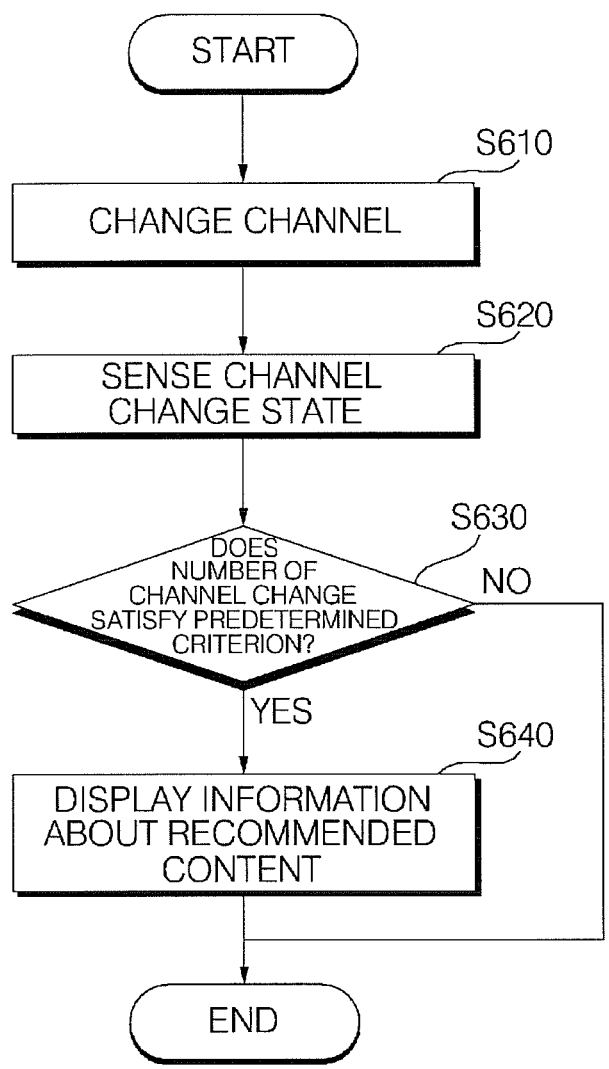
FIG. 6 is a flowchart illustrating a method for operating an image display apparatus according to an example embodiment.

FIG. 6 is a flowchart illustrating a method for operating an image display apparatus according to an example embodiment. FIGS. 7 to 12 are views for describing various examples of a method for operating the image display apparatus.

The image display apparatus 100 may change channels based on a user channel change command from the remote controller 200 received through a local key or the user input interface 150 (S610), and the controller 170 may sense a channel change state (S620).

In sensing the channel change state of operation S620, the controller 170 may sense a holding time of the changed channel. That is, the controller 170 may sense how long the user views the changed channel after the channel change.

The controller 170 may sense and count the number of channel changes for a predetermined period of time. For example, if a reference time is set to 1 minute, the controller 170 may count the number of channel changes for 1 minute.

Alternatively, sensing the channel change state of operation S620, the controller 170 may sense that the channel is consecutively changed for a predetermined time. For example, if the channel is changed within 10 seconds after the channel change, is changed within 10 seconds thereafter and is changed after 3 minutes, the controller 170 may determine that channels have consecutively been changed three times.

The controller 170 may sense both the holding time of the changed channel and the number of channel changes.

The controller 170 may control display of information regarding (or about) recommended content on the display 180 (S640) when the number of channel changes satisfies a predetermined criterion (S630).

The controller 170 may determine whether a plurality of channels that are not viewed by the user has been changed.

The controller 170 may determine that the plurality of channels that are not viewed by the user has been meaninglessly changed when the predetermined criterion is satisfied.

The predetermined criterion may include an example in that a holding time of a changed channel is less than a reference time. For example, if the changed channel is not held for 10 seconds or more and a channel change command is received, the controller 180 may determine that the user does not search for desired content and recommend predetermined content.

Alternatively, the predetermined criterion may include an example in which the number of channel changes in which the holding time of the changed channel is less than a reference time is equal to or greater than a predetermined value. For example, if the number of channel changes is 10 in which the holding time of the changed channel is 10 seconds or less, the controller 10 may display information regarding (or about) recommended content on the display 180 to recommend predetermined content.

Alternatively, the predetermined criterion may include an example in which the channels are consecutively changed a predetermined number of times or more. For example, if the channels are consecutively changed 20 times or more, the controller 180 may determine that the user does not search for desired content and may recommend predetermined content.

Referring to the figures, it is assumed that the predetermined criterion may include an example in which the number of channel changes is 20 or more in which the holding time of the changed channel is 10 seconds or less.

Figure 7:
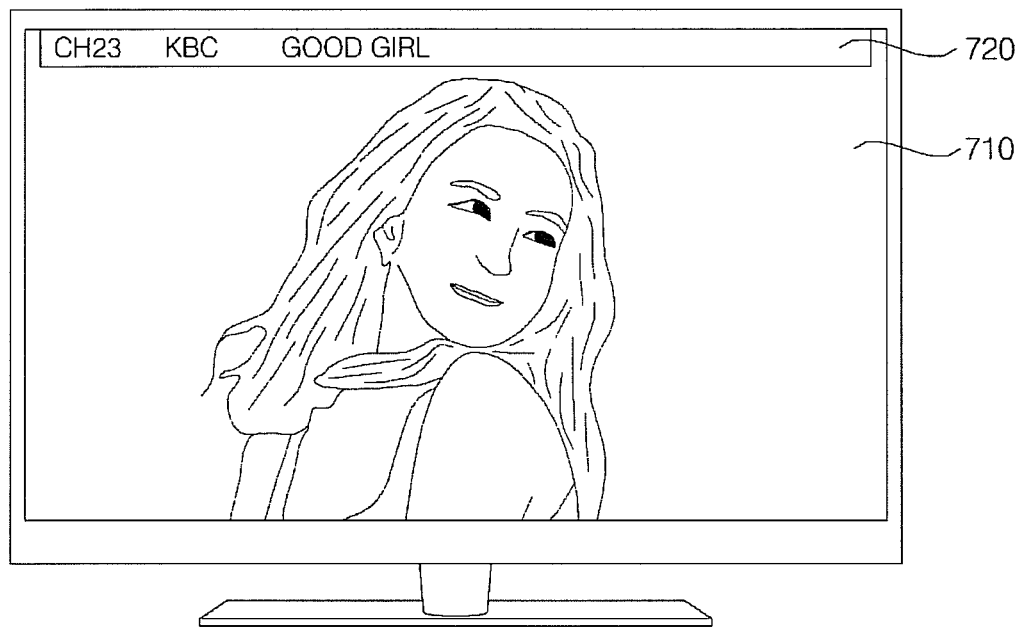
FIGS. 7 to 12 are views for describing various examples of the method for operating the image display apparatus.

If the number of channel changes is 19 in which the holding time of the changed channel is 10 seconds or less, as shown in FIG. 7, an image 710 of the changed channel may be displayed on the display 180.

A channel banner 720 including a channel number, a channel name (broadcast station name), program information, etc. may be further displayed for a predetermined time in a predetermined region of the display 180 (e.g., an upper end of a screen).

Figure 8:
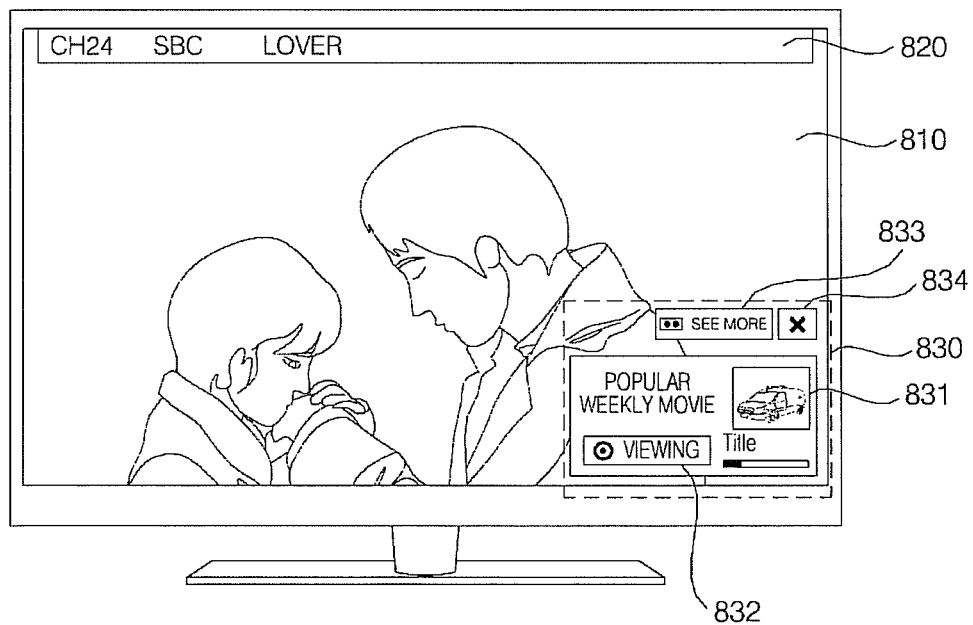

When the channel, the holding time of which is 10 seconds or less, is further changed thereafter, the predetermined criterion of 20 times is satisfied. Therefore, as shown in FIG. 8, the controller 170 may control display of the image 810 of the changed channel on the display 180 and control display of information 830 regarding (or about) recommended content in a predetermined region of the display 180.

A channel banner 820 may be further displayed.

The recommended content may be determined based on a viewing history of the image display apparatus, registered favorite channels and/or registered content providers.

The recommended content may be content that is frequently used based on the viewing history. For example, the recommended content may be a channel and/or broadcast program that is frequently viewed by the user using the image display apparatus.

At least one of the registered favorite channels may be recommended or information regarding (or about) recommended content of the registered content providers may be displayed.

Alternatively, the recommended content may be recommended content information received from an external server or electronic apparatus via the network interface 135. Popular content may be recommended according to received popularity list information of content. That is, popularity list information of a predetermined server or a content provider may be received via the network interface 135 and one or more pieces of content of high rank may be recommended.

The method for operating the image display apparatus may further include receiving the information regarding (or about) the recommended content via means such as the tuner unit 110 and the network interface 135.

The network interface 135 may receive the content information from the image display apparatus and store the content information in the memory 140.

The recommended content information received through the network interface 135 may further include information for immediately playing the recommended content back when the user selects the recommended content.

For example, the recommended content information may include at least one of content type information indicating at least one of video, a real-time broadcast program and an application, a content identifier, URL link information, a channel name, a physical channel number, a major channel number, a minor channel number, a start time of content and/or an end time of content.

If the recommended content is a broadcast program, the recommended content information may be broadcast information. The broadcast information may include at least of a channel name, a physical channel number, a major channel number, a minor channel number, a broadcast channel name, a start time and an end time.

The recommended content information may further include channel information used for the tuner unit 110. The tuner unit 110 may tune to a channel indicated by the extracted broadcast information and receive a real-time broadcast indicated by the broadcast information through the tuned channel.

The recommended content may be content having highest ratings or highest utilization ratios. Alternatively, the recommended content may be information regarding (or about) most popular VOD for a predetermined time (e.g., for a week).

The recommended content may be content of an apparatus connected to the image display apparatus via the external device interface 130.

The external device interface 130 may be connected to an external apparatus such as a digital versatile disc (DVD), a Blu-ray player, a game console, a camera, a camcorder, a computer (e.g., a laptop computer), a set-top box by wire or wirelessly so as to perform an input/output operation with an external apparatus.

According to an embodiment, if a user continues to meaninglessly change a channel, content of an apparatus connected via the external device interface 130 may be recommended to be immediately used and the content of the apparatus connected to the external terminal may be easily used without additional settings.

Operation S640 of displaying the information regarding (or about) the recommended content may include displaying the information regarding (or about) the recommended content on the image of the changed channel in a pop-up manner.

That is, as shown in FIG. 8, while the channel image 810 is continuously displayed on the display 180, the information 830 regarding (or about) the recommended content may be displayed on the display 180 for a predetermined time in a pop-up manner (or pop-up window).

The information 830 regarding (or about) the recommended content may include at least one of a representative thumbnail image 831, a viewing item 832, a "see more" item 833 and an exit item 834 in addition to information regarding (or about) the recommended content in the form of text.

If the user ignores the pop-up recommended content information and continues to change channels (or perform channel zapping), the pop-up information may be set to disappear after 5 seconds from a pop-up information generation time.

Figure 9:
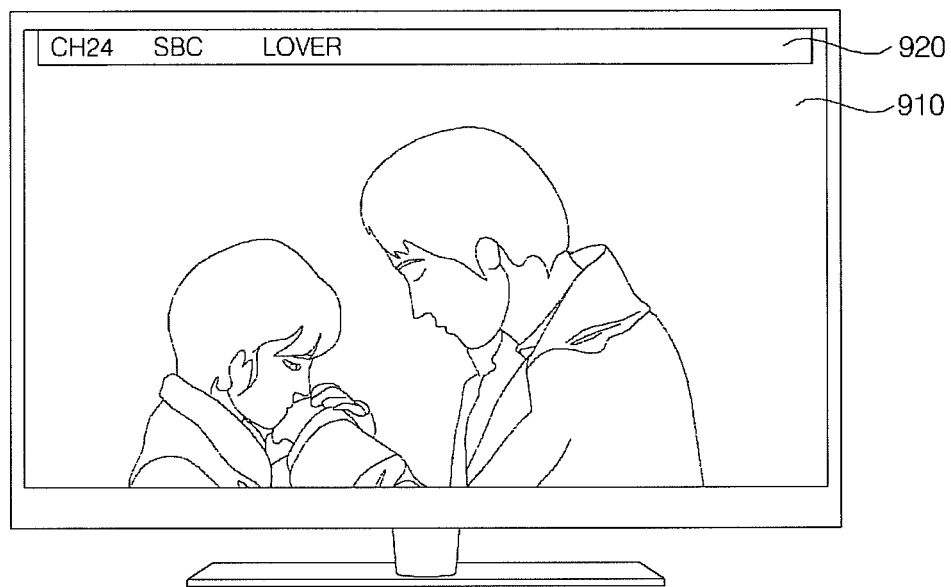

FIG. 9 shows an example in which pop-up recommended content information 830 disappears and a broadcast image 910 of a finally changed channel is displayed.

A channel banner 920 may be displayed to provide information regarding (or about) the channel to the user.

The method for operating the image display apparatus may further include playing the recommended content back or changing the channel to a broadcast channel of the recommended content when a predetermined item of the information regarding (or about) the recommended content is selected or a predetermined key button of the remote controller 200 is pressed.

For example, if the viewing item 832 included in the information 830 regarding (or about) the recommended content is selected or the OK key button of the remote controller 200 is pressed, the recommended content may be played back.

Alternatively, if a predetermined item of the information regarding (or about) the recommended content is selected or a predetermined key button of the remote controller 200 is pressed, the display 180 may display additional information of the recommended content in at least a part of the display 180.

The additional information may include information regarding (or about) a plurality of pieces of content including the recommended content. The plurality of pieces of content may include the recommended content and content associated with the recommended content (e.g., series, movies of the same actor or director), and next popular content of the recommended content.

If the user selects one of a plurality of pieces of content, the display 180 may display detailed information of the selected content on the entire screen (or almost entire screen) of the display 180.

Figure 10:
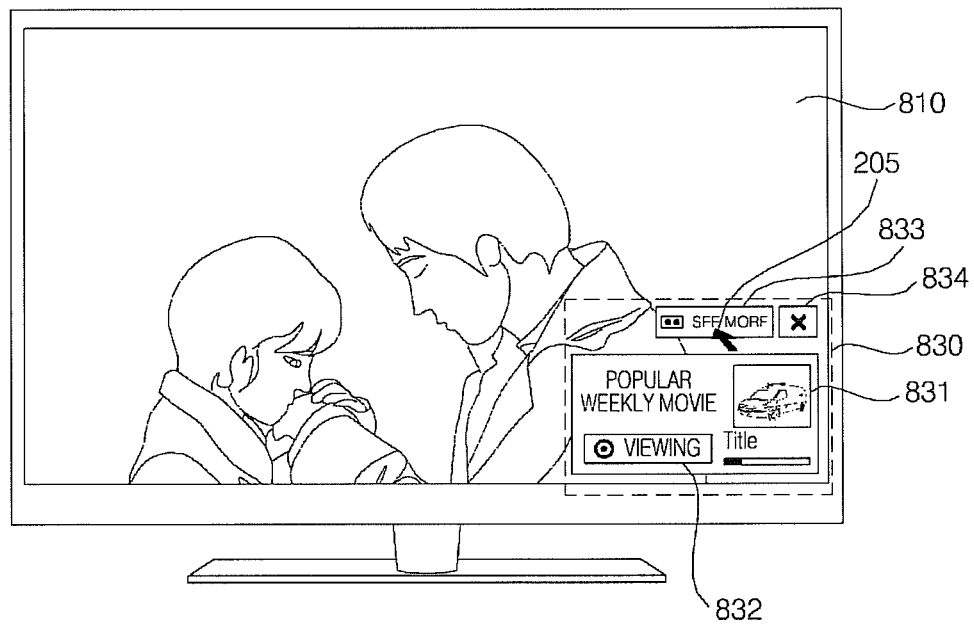
Figure 11:
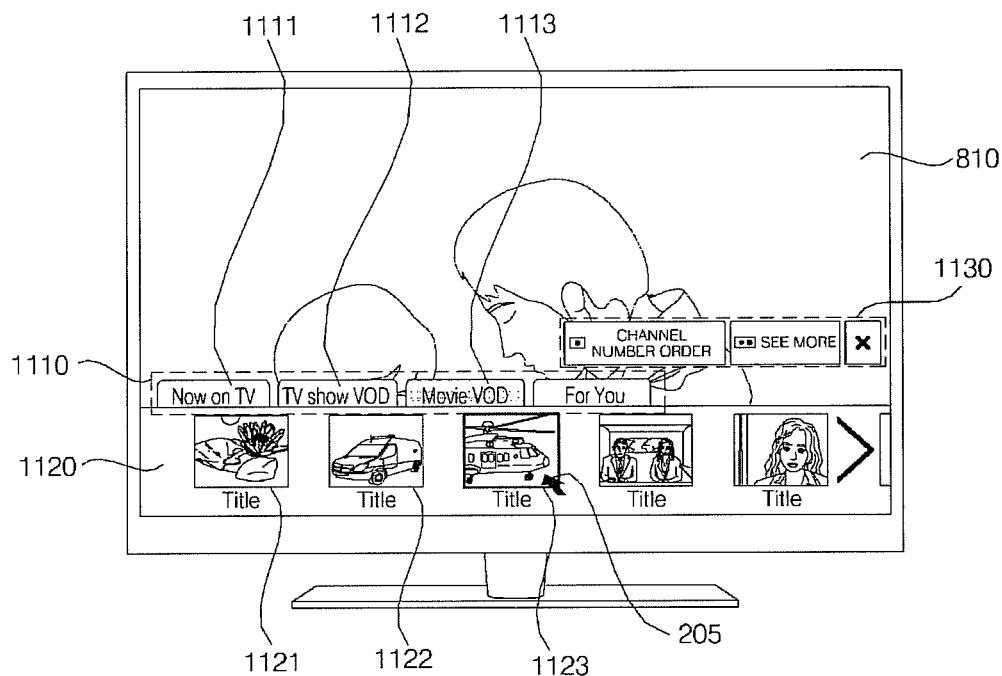

Referring to FIG. 10, if the user moves the pointer 205 using the remote controller 200 to select the "see more" item 833, a category tab menu 1110 including a plurality of categories 1111, 1112 and 1113 and a plurality of recommended content items 1130 included in a selected category 1113 may be displayed as shown in FIG. 11.

Menu items 1130 of additional information may be further displayed.

Figure 12:
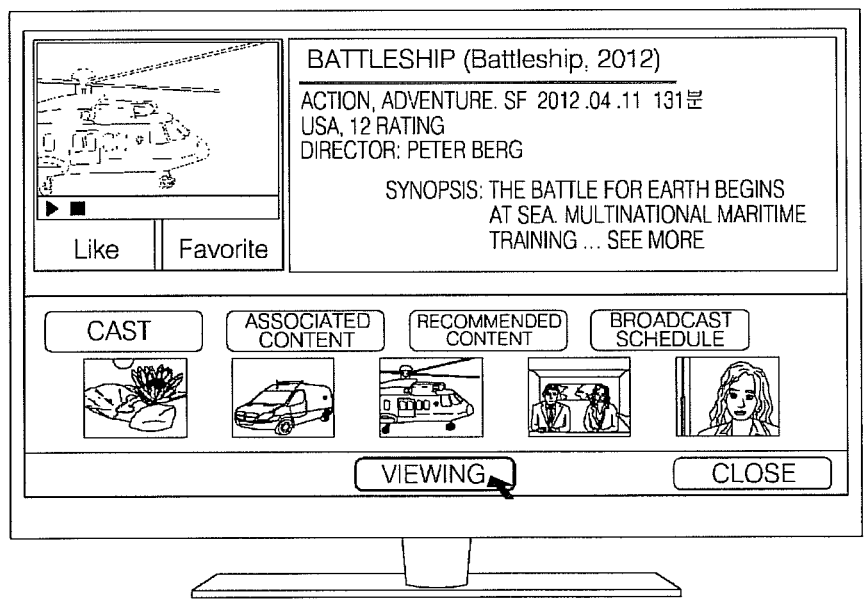

If the user selects one (i.e., the category 1113) of a plurality of pieces of recommended content 1121, 1122, 1123 and 1124 using the pointer 205 or a directional key, detailed information of the selected content may be displayed as shown in FIG. 12.

Alternatively, if the user selects one (i.e., the category 1113) of a plurality of pieces of recommended content 1121, 1122, 1123 and 1124 using the pointer 205 or a directional key, the selected content may be immediately played back.

In displaying the information regarding (or about) the recommended content in operation S640, additional channel change may be stopped in a state of displaying the information regarding (or about) the recommended content.

For example, if the information regarding (or about) the recommended content is set to disappear when a user input is not received while the information regarding (or about) the recommended content is displayed for 5 seconds, the channel may not change even when a user inputs a channel change command for 5 seconds.

Alternatively, channel changing or channel zapping may be continuously performed in correspondence with a command input by the user, regardless of display of the information regarding (or about) the recommended content.

Figure 13:
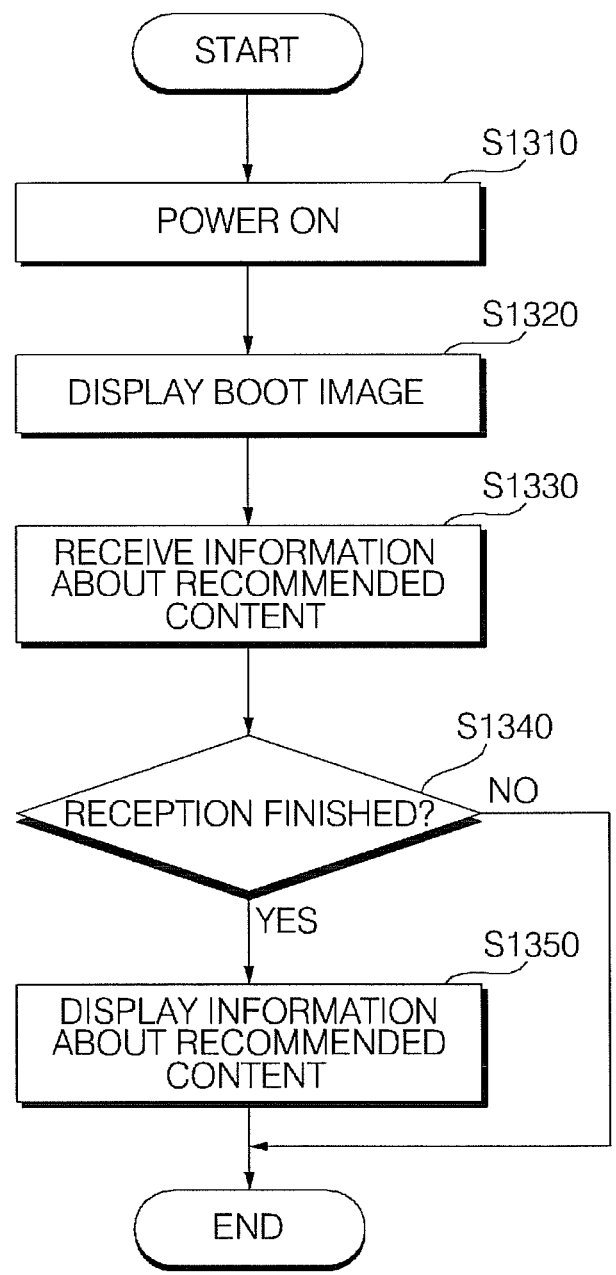
FIG. 13 is a flowchart illustrating a method for operating an image display apparatus according to an example embodiment.
Figure 14:
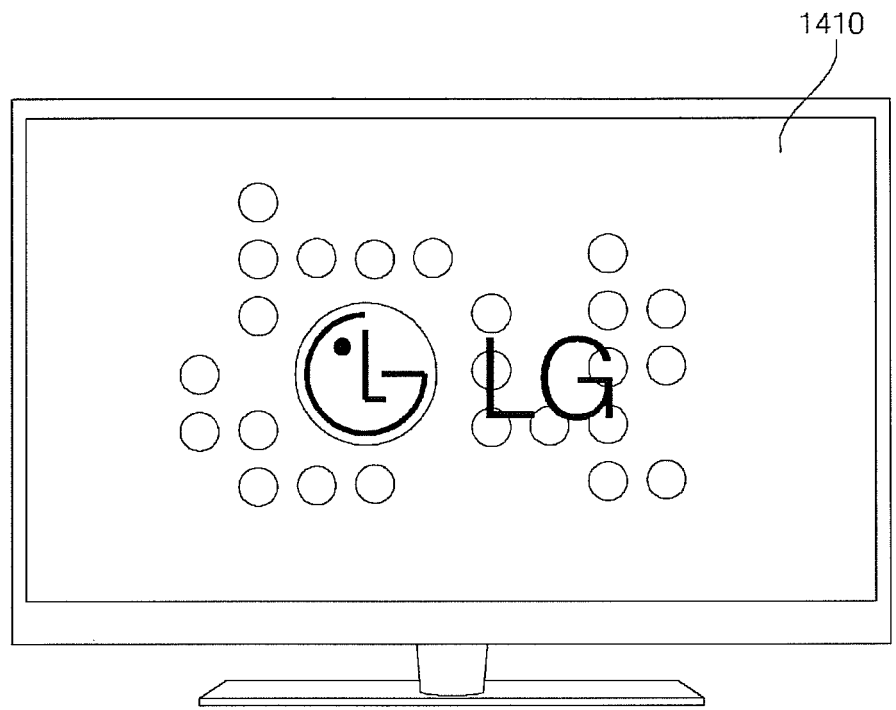
FIGS. 14 to 17 are views for describing various examples of the method for operating the image display apparatus.
Figure 15:
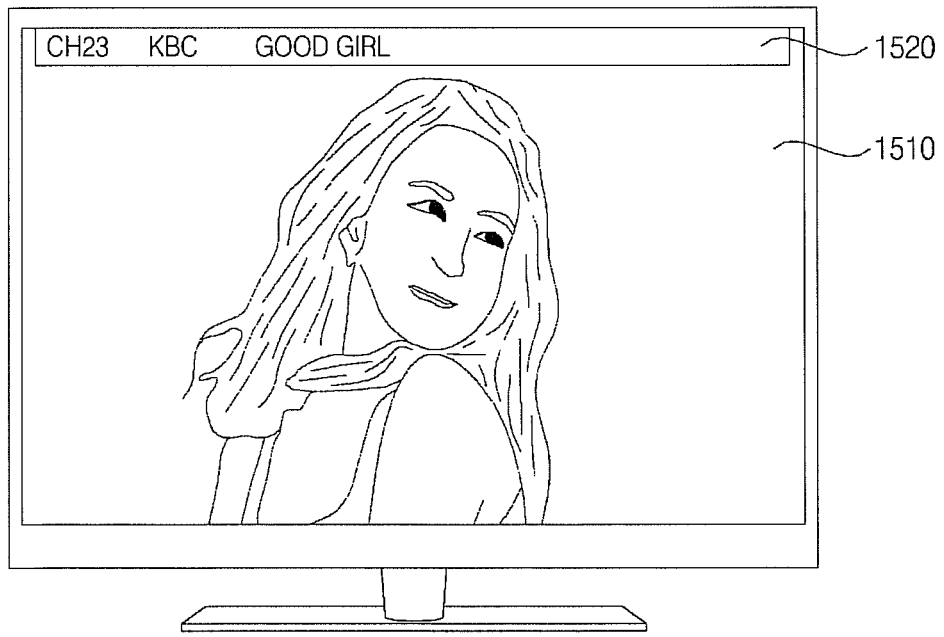
Figure 16:
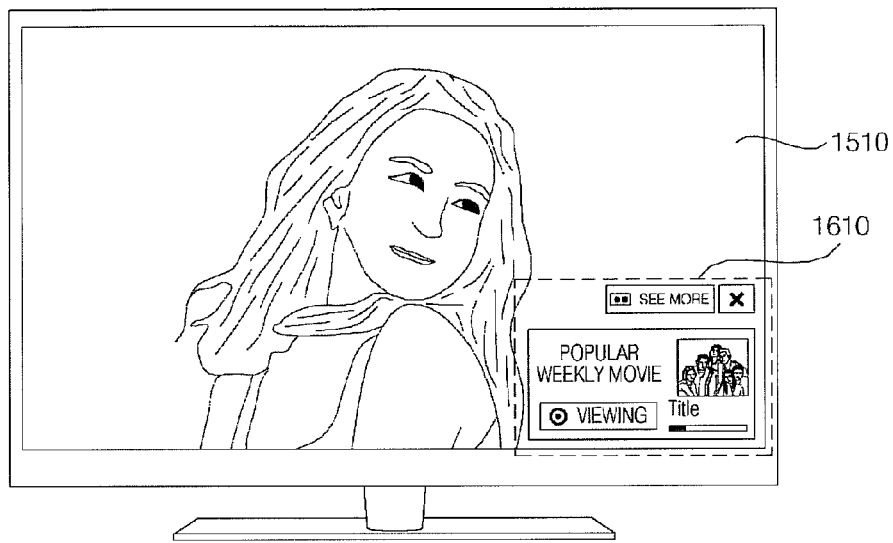
Figure 17:
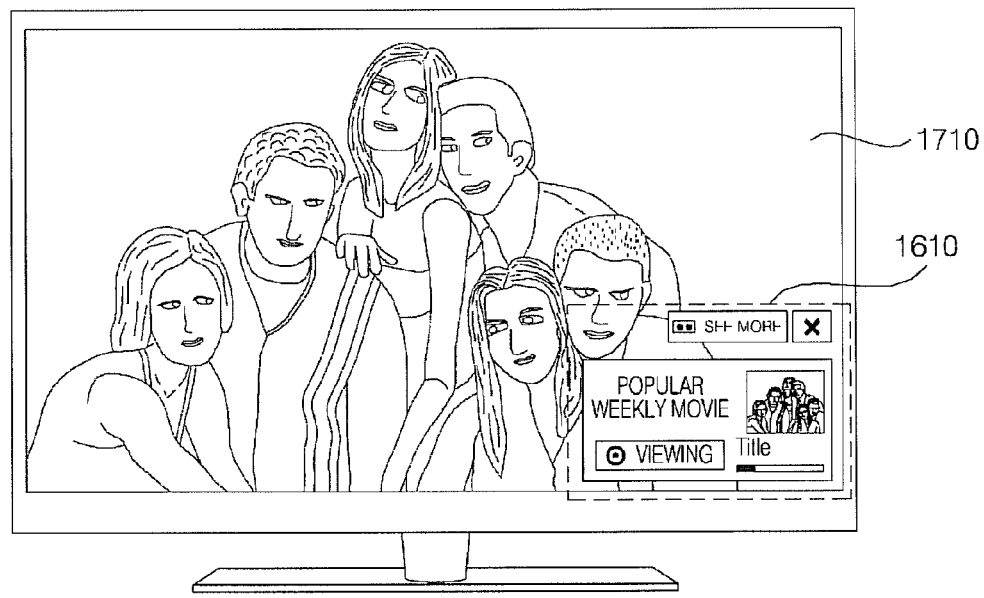

FIG. 13 is a flowchart illustrating a method for operating an image display apparatus according to an example embodiment, FIGS. 14 to 17 are views for describing various examples of a method for operating the image display apparatus. Other embodiments may also be provided.

In the method for operating the image display apparatus, if power is turned on (S1310), a boot image 1410 may be displayed on the display 180 (S1320).

The image display apparatus 100 may receive the information regarding (or about) the recommended content through the tuner unit 110 and the network interface 135 (S1330).

Thereafter, if reception of the information is finished (S1340), the controller 170 may control display of the information of the recommended content on the display 180 (S1350).

The method for operating the image display apparatus may include displaying a predetermined channel image 1510 on the display 180. In displaying the information regarding (or about) the recommended content in operation S1350, the information 1610 regarding (or about) the recommended content may be displayed on the predetermined channel image 1510 in a pop-up manner or in a pop-up window.

The recommended content may be content having highest ratings or highest utilization ratios. Alternatively, the recommended content may be information regarding a most popular VOD for a predetermined time, e.g., for a week.

The method for operating the image display apparatus may further include playing the recommended content back or changing the channel to the broadcast channel 1710 of the recommended content when a predetermined item of the information regarding the recommended content is selected or a predetermined key button of the remote controller 200 is pressed (i.e., a command is received).

Accordingly, the recommended content may be immediately used by accepting the recommended content without looking for channels or content when the power is turned on.

Accordingly, popular content or favorite content may be recommended to the user who turns on the TV or changes the channel to search for content to be viewed.

For example, when the TV is turned on, a favorite broadcast may be recommended based on a highest rated broadcast among current broadcasts or a user viewing history.

If a predetermined criterion is satisfied, such as if a channel change is performed a predetermined number of times, a highest rated broadcast, VOD viewed by many users or a favorite broadcast or VOD that is determined based on a user viewing history may be recommended.

A recommended broadcast may be displayed by selecting a channel corresponding to the recommended broadcast once and recommended VOD may be displayed in detail or played back by selecting a channel corresponding to the recommended VOD once.

A user convenience may be improved.

Accordingly, appropriate information may be provided to the user at an appropriate time when a user meaninglessly changes the channel.

Additionally, a user may easily select and execute the recommended content. This may increase user convenience.

Figure 18:
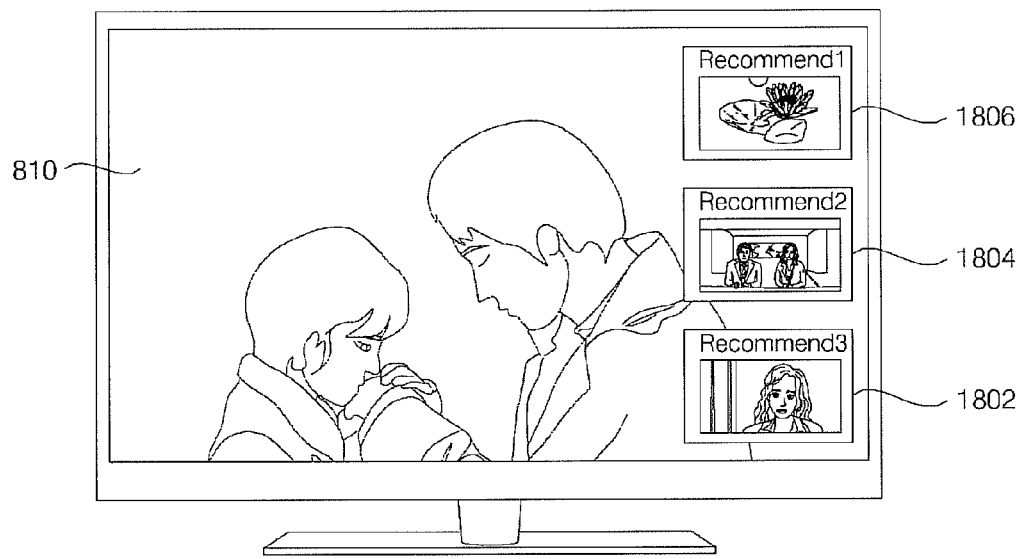
FIG. 18 shows a display of an image display apparatus according to an example embodiment.

FIG. 18 shows a display of an image display apparatus according to an example embodiment. Other embodiments may also be provided.

FIG. 18 shows a plurality of windows 1802, 1804 and 1806 may be displayed in one area of the screen. FIG. 18 shows a first window 1802, a second window 1804 and a third window 1806. Each of the windows may contain different information of recommended content. The image 810 may be displayed with the display of the windows, even when the recommended content changes in the windows.

When a user continues to change a channel, such as using the remote controller 200, then information of the recommended content in each of the windows 1802, 1804, 1806 may change. For example, information of first recommended content may be displayed in the first window 1802, information of second recommended content may be displayed in the second window 1804 and information of third recommended window content may be displayed in the third window 1806.

When the user continues to select a channel change, then information of the second recommended content may be displayed in the first window 1802, information of the third recommended content may be displayed in the second window 1804 and information of fourth recommended content may be displayed in the third window 1806.

Accordingly, the user may scroll through different recommended contents in each of the displayed windows based on a further channel change. During this time, the image 810 provided on the screen may not change channels. In other words, the background image may not change while the recommended content may change (in a specific area of the screen due to a channel change command.

Figure 19:
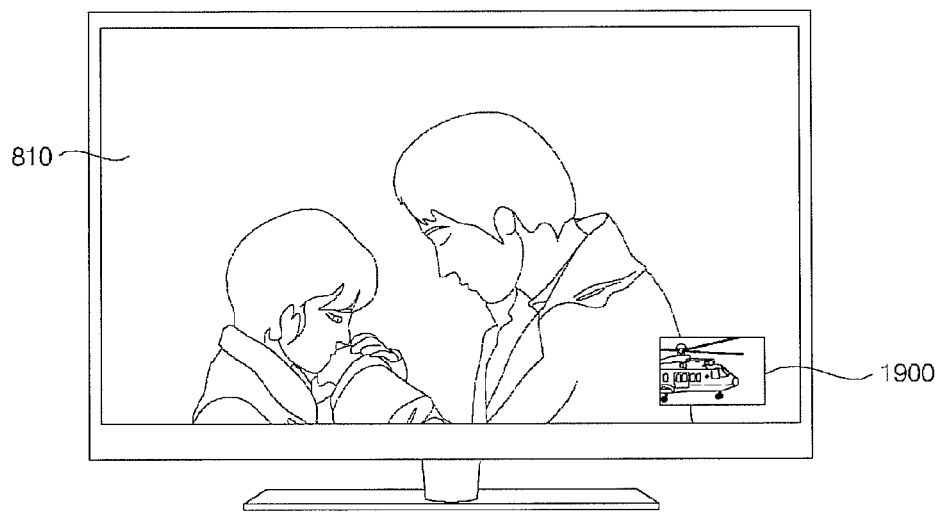
FIG. 19 shows a display of an image display apparatus according to an example embodiment.

FIG. 19 shows a display of an image display apparatus according to an example embodiment. Other embodiments may also be provided.

FIG. 19 shows a window 1900 displayed over the image 810 on the image display apparatus. The window 1900 may display a first recommended content while the image 810 relates to a selected channel. When the user continues to change a channel, such as using the remote controller 200, then information of the recommended content within the window 1900 may change. For example, information of the first recommended content in the window 1900 may change to information of the second recommended content. Upon a further channel change, information of the second recommended content may change to information of the third recommended content. During this time, the image 810 provided on the screen may not change channels. In other words, the background image may not change while the recommended content may change (in a specific area of the screen due to a channel change command.

Embodiments have been made in view of the above problems. Embodiments may provide an image display apparatus and a method for operating the same, which are capable of increasing user convenience.

Embodiments may provide an image display apparatus and a method for operating the same that are capable of efficiently recommending content when a user meaninglessly uses the image display apparatus.

Embodiments may be accomplished by the provision of a method for operating an image display apparatus using a remote controller, including changing channels based on a user channel change command, sensing a channel change state, and displaying information about recommended content when the number of channel changes satisfies a predetermined criterion.

An image display apparatus may include a display, a user input interface configured to receive a user channel change command, and a controller configured to change channels based on the channel change command and sense a channel change state. The controller may control information regarding recommended content on the display when the number of channel changes satisfies a predetermined criterion.

A method may be provided for operating an image display apparatus. The method may include displaying a boot image when power is turned on, receiving information regarding recommended content, and displaying the information regarding the recommended content when reception of the information is finished.

The method for operating an image display apparatus may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display method of an image display apparatus, the method comprising:
   changing channels on the image display apparatus based on a command to channel change;
   determining when a total number of changed channels satisfies a prescribed criterion;
   displaying information regarding recommended content when the determined total number of channel changes satisfies the prescribed criterion;
   playing the recommended content or changing the channel to a broadcast channel of the recommended content when an item of the information regarding the recommended content is selected or a predetermined command is received,
   displaying additional information of the recommended content in at least a part of a display when an item of the information regarding the recommended content is selected or a predetermined command is received from a remote controller; and
   wherein the displaying of the information includes stopping additional channel change in a state in which the information regarding the recommended content is displayed,
   wherein the additional information includes a category tab menu including a plurality of categories, a plurality of recommended content items included in a selected category and menu items,
   wherein the displayed information regarding the recommended content is displayed in a first area of a screen while displaying at least one image of a channel in a second area of the screen,
   and the method further comprising:
      receiving a command to change a channel while the information regarding the recommended content is displayed in a window in the first area; and
      in response to receiving the command, changing the information in the window in the first area to information regarding other recommended content while maintaining the image of the channel displayed in the second area.

2. The method according to claim 1, wherein the determining includes determining the total number of channel changes and a holding time of a changed channel.

3. The method according to claim 1, wherein the prescribed criterion relates to a holding time of a changed channel being less than a prescribed reference time.

4. The method according to claim 3, wherein the prescribed criterion relates to the total number of channel changes and having the holding time of the changed channel be less than the prescribed reference time.

5. The method according to claim 1, wherein the prescribed criterion relates to channels that are changed at least a prescribed number of times.

6. The method according to claim 1, wherein the recommended content is based on a viewing history of the image display apparatus.

7. The method according to claim 1, wherein the recommended content is based on previously stored favorite channels.

8. The method according to claim 1, wherein the recommended content is provided from a content provider.

9. The method according to claim 1, wherein the recommended content is based on content popularity list information.

10. The method according to claim 1, wherein displaying the information regarding the recommended content includes displaying information regarding the recommended content in a window while simultaneously displaying an image of the changed channel.

11. An image display apparatus comprising:
    a display;
    a user input interface to receive a command to change channel; and
    a controller to change channels on the display based on the channel change command, and the controller to further determine when a total number of channel changes satisfies a prescribed criteria,
    wherein the controller controls the display to display information regarding recommended content on the display when the total number of channel changes satisfies the prescribed criterion, to display additional information of the recommended content in at least a part of the display when an item of the information regarding the recommended content is selected or a predetermined command is received from a remote controller, and the controller to play the recommended content or to change the channel to a broadcast channel of the recommended content when an item of the information regarding the recommended content is selected or a predetermined command is received, and
    wherein the display of information includes stopping additional channel change in a state in which the information regarding the recommended content is displayed,
    wherein the additional information includes a category tab menu including a plurality of categories, a plurality of recommended content items included in a selected category and menu items,
    wherein the display displays information regarding the recommended content in a first area while the display displays at least an image of a channel in a second area,
    wherein the apparatus receives a command to change a channel while the information regarding the recommended content is displayed in a window in the first area, and in response to receiving the command to change the channel, the controller changes the information in the window in the first area to information regarding other recommended content while maintaining the channel displayed in the second area.

12. The apparatus according to claim 11, wherein the controller determines the total number of channel changes and a holding time of a changed channel.

13. The apparatus according to claim 11, wherein the prescribed criterion relates to a holding time of a changed channel being less than a prescribed reference time.

14. The apparatus according to claim 13, wherein the prescribed criterion relates to the total number of channel changes and having the holding time of the changed channel be less than the prescribed reference time.

15. The apparatus according to claim 11, wherein the prescribed criterion relates to channels that are changed at least a prescribed number of times.

16. The apparatus according to claim 11, wherein the recommended content is based on a viewing history of the image display apparatus.

17. The apparatus according to claim 11, wherein the recommended content is based on a previously stored favorite channel.

18. The apparatus according to claim 11, wherein the recommended content is provided from a content provider.

19. The apparatus according to claim 11, wherein the recommended content is determined based on content popularity list information received through a network interface.

20. A display method of an image display apparatus, the method comprising:

receiving an input to channel change;

changing channels on the image display apparatus based on the received input;

determining when a total number of received inputs is at least a prescribed number;

when the determined number of received inputs is at least the prescribed number, displaying, in a pop-up window for a predetermined time, information regarding recommended content while simultaneously displaying an image, wherein the displaying of the information includes stopping additional channel change in a state in which the information regarding the recommended content is displayed;

receiving a selection of at least one of the displayed recommended content;

in response to receiving the selection, playing the recommended content; and displaying additional information of the recommended content in at least a part of a display when an item of the information regarding the recommended content is selected or a predetermined command is received from a remote controller;

wherein the additional information includes a category tab menu including a plurality of categories, a plurality of recommended content items included in a selected category and menu items, wherein the displayed information regarding the recommended content is displayed in a first area of a screen while displaying at least one image of a channel in a second area of the screen, and the method further comprising:

receiving a command to change a channel while the information regarding the recommended content is displayed in a window in the first area; and in response to receiving the command, changing the information in the window in the first area to information regarding other recommended content while maintaining the image of the channel displayed in the second area.

* * * * *